United States Patent [19]
Karlen

[11] 3,771,432
[45] Nov. 13, 1973

[54] HOT WATER SUPPLY APPARATUS
[75] Inventor: Harvey R. Karlen, Chicago, Ill.
[73] Assignee: Cory Corporation, Chicago, Ill.
[22] Filed: Sept. 28, 1971
[21] Appl. No.: 184,524

[52] U.S. Cl. .................................. 99/304, 99/307
[51] Int. Cl. ........................................... A47j 31/00
[58] Field of Search ..................... 99/300, 280, 281, 99/282, 283, 295, 302, 304, 305, 307

[56] References Cited
UNITED STATES PATENTS

| | | | |
|---|---|---|---|
| 3,343,478 | 9/1967 | Hausam | 99/283 |
| 3,412,672 | 11/1968 | Herbsthofer | 99/300 |
| 3,261,279 | 7/1966 | Kaplan | 99/307 |
| 3,479,949 | 11/1969 | Reynolds | 99/295 |

Primary Examiner—Robert W. Jenkins
Attorney—Hofgren, Wegner, Allen, Stellman & McCord

[57] ABSTRACT

An apparatus for delivering hot water to a receiver, such as a coffee brewer cartridge, which is selectively arranged to provide hot water from a heating tank comprising a portion of the apparatus as an incident of either the delivery of cold water to the heating tank by pouring of the cold water into a basin adjacent the heating tank, or delivery of cold water from a source thereof under pressure through a valve controlled conduit adapted to deliver the cold water also into the basin. The basin is selectively connected to the heating tank or to the brewing cartridge providing improved selective operation of the apparatus in a plurality of different modes.

16 Claims, 2 Drawing Figures

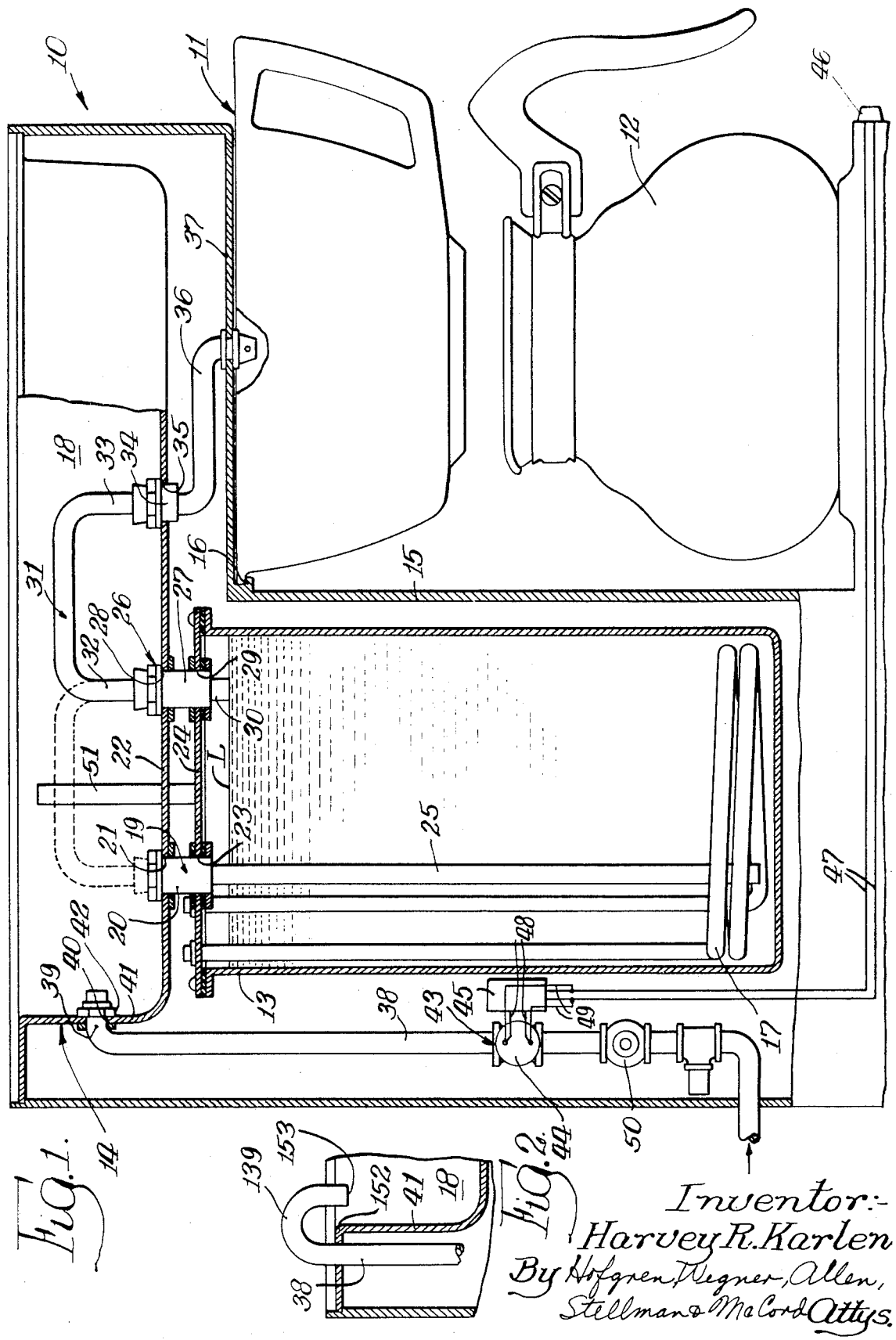

HOT WATER SUPPLY APPARATUS

BACKGROUND OF THE INVENTION

1. Field of the Invention

This invention relates to apparatuses for delivering hot water to a receiver, such as a coffee brewing cartridge, and more specifically to such apparatuses wherein the hot water is delivered to the receiver as a result of delivery of cold water thereto by means of a basin into which the cold water is initially delivered.

2. Description of the Prior Art

In one improved form of hot water delivery system for use in coffee brewers and the like, a pour-through mode of operation is provided by means of a basin which is disposed above the heating tank and arranged to have cold water poured thereinto and subsequently be transferred through an inlet conduit from the basin to the tank. The introduction of the cold water into the tank causes a displacement of previously heated hot water therefrom into the brewing coffee through a suitable outlet from the tank so that the quantity of hot water so delivered is substantially similar to the quantity of cold water introduced into the tank. The cold water is then heated in the tank, permitting a subsequent similar operation for subsequent brewing operations. Such a hot water heater is shown in the U.S. Pat. to Joseph S. Losee, original No. 2,146,022, issued Feb. 7, 1938, and the subsequent U.S. Pat. No. Re 21,393, reissued Mar. 12, 1940, for an Electric Water Heater. Other U.S. Pat. showing such hot water heaters are those of Sharp No. 2,247,824, Ferris Nos. 2,269,448 and 2,299,053, Babson et al. Re22,866 (orig. U.S. Pat. No. 2,408,403), E. W. Losee U.S. Pat. No. 2,422,492 and 2,542,543, Palm U.S. Pat. No. 2,428,466, Hall U.S. Pat. No. 2,456,698 and Martin U.S. Pat. Nos. 3,220,324 and 3,368,856.

Creager U.S. Pat. No. 2,835,415 shows a hot water heater utilizing a siphon outlet and having an inlet conduit adapted to be connected to a source of water under pressure. Bunn U.S. Pat. No. Re25.663 similarly shows a hot water heater wherein the water is delivered under pressure to the hot water tank and delivered therefrom through a siphon outlet.

The patent to Karlen et al. U.S. Pat. No. 3,366,034, owned by the assignee hereof, discloses an improved form of such a basin-type hot water supply apparatus. A further improved form of such an apparatus is disclosed in the patent to Karlen et al. U.S. Pat. No. 3,415,267, and also owned by the assignee hereof. The structure thereof utilizes a plug-in connector for selectively providing a pourthrough operation wherein the cold water enters the tank and displaces the hot water from the tank to the outlet as discussed above, or a pour-over operation wherein hot water may be poured into the basin and caused to pass directly to the outlet, bypassing the hot water tank such as in the event of a failure of the heating system thereof.

SUMMARY OF THE INVENTION

The present invention comprehends a further improved hot water delivery apparatus of the type utilizing a supply basin for receiving poured-in cold water to effect a desired delivery of hot water from an associated heating tank such as to a coffee brewer cartridge. The present invention comprehends the provision of such an apparatus which selectively permits delivery of the cold water to the basin by the pouring in of the cold water from a container, such as a decanter, or the like, or from a source of water under pressure. Means are provided for controlling the delivery of such pressurized water so as to provide such delivery for a preselected period of time suitable to effect a delivery of a desired quantity of hot water from the tank such as a quantity sufficient to make one decanter full of water.

The pressurized water delivery control means may comprise a solenoid operated control valve and manually operated switch means permitting the user to initiate the delivery cycle as desired. The control means may include means for causing a continued opening of the delivery valve by manual control of the switch means in the event that the timer provided in the control circuit fails thus providing manual control of the quantity of water delivered from the pressurized source.

The invention comprehends delivering the water from the pressurized source into the open-to-atmosphere basin, preventing backup siphoning of the water from the hot water tank by virtue of the breaking of the delivery conduit from the source to the tank by the interpositioning of the basin in the delivery system. The delivery conduit may be brought through a side wall of the basin or may be brought over the side wall in different embodiments of the invention.

The basin may be provided with selective flow control means permitting the above described pour-through or pour-over operations. More specifically, the basin may be provided with a plug-in connector for selectively connecting the outlet from the tank opening into the bottom of the basin either to the inlet to the tank opening downwardly through the bottom of the basin, or the opening in the bottom of the tank leading to the means for conducting the hot water to the receiver. Thus, cold water may be delivered from the source of water under pressure through the basin directly to the receiver such as for effecting a flushing operation when desired. Alternatively, the conduit for delivering hot water from the pressurized source may comprise a hot water supply conduit whereby hot water may be directly delivered through the basin to the receiver when desired.

Thus, the apparatus of the present invention is adapted for use in a restaurant, or the like, where continuous coffee service must be maintained. The device may be arranged to operate in a normal mode wherein cold water is poured into the basin from the supply container for displacing the previously heated water to the cartridge to effect a brewing of the desired quantity of coffee. In the event that the tank heater fails, hot water from another source may be poured directly through the basin to the receiver for continued coffee brewing service. Alternatively, the cold water may be brought into the basin through a cold water supply controlled by a valve. The valve may be maintained open automatically for a preselected period of time by a suitable timer. In the event that the timer fails, the control is arranged to permit the user to cause an opening of the valve under the direct manual control of the operator. Should the solenoid operator fail, the user may pour cold water directly into the basin to bypass the pressurized water source.

Thus, any one of a number of different modes of operation may be utilized alternatively so as to assure continued coffee brewing service while yet the apparatus of the disclosed invention is extremely simple and economical of construction requiring effectively minimum maintenance.

BRIEF DESCRIPTION OF THE DRAWING

Other features and advantages of the invention will be apparent from the following description taken in connection with the accompanying drawing wherein:

FIG. 1 is a front elevation with portions broken away showing an apparatus for delivering hot water to a coffee brewing cartridge embodying the invention; and FIG. 2 is a fragmentary vertical section illustrating a modified form of means for delivering the incoming water to the basin thereof.

DESCRIPTION OF THE PREFERRED EMBODIMENT

In the exemplary embodiment of the invention as disclosed in the drawing, an apparatus generally designated 10 is arranged for delivering hot water to a receiver herein comprising a coffee brewing cartridge generally designated 11 from which the brewed coffee may be delivered to a subjacent decanter 12. Hot water supply apparatus 10 comprises a basin-type hot water supply means wherein water is delivered to a heating tank 13 from a basin 14 disposed superjacent the tank 13. The apparatus may be housed in a suitable cabinet 15 having means 16 for removably supporting the brewing cartridge 11 permitting the brewing cartridge to be serviced by replacement of the ground coffee charge therein in the conventional manner. Water is heated in tank 13 by a suitable heater 17 which may comprise a conventional electric heating element.

Water is delivered from the space 18 in basin 14 to the tank 13 through an inlet 19 having a connector 20 extending between an opening 21 in the bottom wall 22 in the basin and an opening 23 in the top wall, or cover, 24 of the tank 13. A depending inlet conduit 25 extends downwardly from connector 20 to discharge the incoming water into the lower end of the tank 13, thereby to displace upwardly the hot water, i.e., the water previously heated in the tank by heater 17. The upwardly displaced hot water is caused to discharge from the tank 13 through an outlet generally designated 26 including a connector 27 extending between a second opening 28 in the basin bottom wall 22 and a second opening 29 in the tank cover 24. A duct 30 may project downwardly from connector 27 into the upper end of the tank 13 to a preselected level L, and a tubular plug-in connector 31 is provided including a first leg 32 removably connected to connector 27 and a second leg 33 removably connected to a third connector 34 extending through a third opening 35 in the basin bottom wall 22 disposed above the cartridge 11. An outlet tube 36 extends downwardly from connector 34 through a horizontal portion 37 of the cabinet directly overlying the center of the cartridge, permitting hot water to pass downwardly from the outlet into the cartridge 11 to effect the desired brewing operation. As shown in dotted lines in FIG. 1, plug-in connector 31 may be selectively repositioned to interconnect outlet connector 27 with inlet connector 20 when desired, thereby closing the tank and permitting water delivered into basin space 18 to flow directly downwardly through connector 34 and outlet tube 36 to the cartridge 11.

Water may be delivered to basin 14 also through a conduit 38 having an upper end 39 extending through an opening 40 in the side wall 41 of the basin and sealingly connected thereto by a suitable connector 42. Control of the delivery of the water through conduit 38 from a source of water under pressure (not shown) is effected by means of a valve 43 having a solenoid operator 44 controlled by a timer 45 of conventional construction. Initiation of the timing operation by timer 45 may be effected by a manually controlled switch 46, herein comprising a toggle switch, connected to the timer by suitable electrical leads 47. The timer may be connected to solenoid 44 through suitable leads 48 and bypass leads 49 may be connected to leads 47 permitting the solenoid to be energized by the manual control of switch 46 independently of the timer 45 when desired. A pressure regulator 50 may be provided in series with valve 43 to permit a preselected volume delivery corresponding to a preselected time of opening of valve 43 whereby the incoming water delivery may be made to be substantially equal to that of the desired quantity of coffee to be brewed.

A safety vent 51 may be provided through cover 24 to permit escape of vapor from the tank in the event the heater 17 is energized when the plug-in connector 31 is connected, as shown in dotted lines in FIG. 1. The basin 18 is open to atmosphere at all times in each mode of operation of the apparatus and the outlet of the cartridge is open to the atmosphere at all times when the plug-in connector 31 is connected, as shown in full lines in FIG. 1.

As illustrated in FIG. 2, in a modified form of apparatus embodying the invention, the conduit 38 may be provided with a gooseneck end portion 139 extending over the upper edge 152 of the basin side wall 41 with the distal end 153 of the conduit 38 opening into the basin space 18 whereby the means for delivering water under pressure to the apparatus is not only functionally disconnected from the tank, by the interpositioning of the basin, but is physically disconnected from either of the basin or tank.

As discussed briefly above, apparatus 10 provides an improved selective control of the delivery of hot water to a receiver, such as a coffee brewing cartridge 11. Normally, hot water may be delivered to the cartridge, such as by manipulation of the switch 46, with the plug-in connector 31 arranged as shown in full lines in FIG. 1. The cold water delivered from the pressurized source is first received in basin 14 thereby breaking any direct connection to the source of pressurized water. The water is then delivered under the preselected gravitational force determined by the spacing of the basin 14 above tank 13 downwardly through conduit 25 to the lower portion of the tank to effect a delivery of hot water from the tank over a preselected period of time suitable for effecting optimum brewing of the coffee in cartridge 11. Thus, the rate of delivery of water into the tank may be substantially greater than the rate of delivery of the hot water to the cartridge 11. In the event of a failure of timer 45, the operator may nevertheless effect a brewing operation by a manual energization of the solenoid 44 by holding switch 46 closed for the preselected period of time normally effected by timer 45. Further, if failure of the solenoid 44 occurs, the operator may nevertheless brew coffee in cartridge 11 by pouring into basin 14 a quantity of cold water corresponding to the quantity of coffee desired to be brewed. Thus, the decanter 12 may be utilized for delivering the cold water into the basin so that upon completion of pouring of cold water into the basin, the decanter may be quickly placed below the cartridge 11 to receive the brewed coffee upon commencement of the brew delivery.

In the event that the heater 17 should fail, the user may nevertheless continue to brew coffee in apparatus 10 by simply redisposing the plug-in connector 31 to the position shown in dotted lines in FIG. 1 wherin hot water may be poured into basin 14 and may be caused to flow directly therefrom through connector 34 and conduit 36 into cartridge 11.

Further, should the user wish to flush out the basin, he may operate solenoid 44 to cause delivery of cold water through the basin and outlet through connector 34 and conduit 36 to a suitable receiver with the plug-in connector shown in the dotted line position of FIG. 1. If he further wishes to flush out tank 13, he may position the plug-in connector in the full line position of FIG. 1 and cause continuous delivery of cold water into the system including the tank 13 by suitable operation of switch 46.

Thus, the apparatus 10 of the present invention provides an improved selective control permitting continuous brewing of coffee notwithstanding the failure of different components of the apparatus so that apparatus 10 is particularly well adapted for use in installations such as restaurant installations where continued coffee brewing service must be provided.

As disclosed above, apparatus 10 is extremely simple and economical of construction while yet providing the highly desirable selective operations. By virtue of the discontinuity in the incoming water delivery system provided by the basin 14 between the delivery conduit 38 and tank 13, back-siphoning of water from the tank is effectively precluded thereby providing a highly desirable antisiphoning action as may occur in devices of the prior art where the incoming water supply is connected directly to the tank.

The foregoing disclosure of specific embodiments is illustrative of the broad inventive concepts comprehended by the invention.

I claim:

1. Apparatus for delivering hot water to a receiver comprising: an upwardly open basin disposed to receive water poured thereinto from a container; a tank having a single inlet for receiving water to be heated, said single inlet being connected to said basin for conducting water delivered into said basin from said basin to the tank; means for heating water in said tank; an outlet for delivering hot water from the tank to said receiver as a result of delivery of water to the tank through said inlet; a supply conduit having a delivery end opening to said basin; valve means for controlling delivery of water under pressure through said conduit into said basin; and means for selectively controlling operation of said valve means whereby delivery of hot water to said receiver may be selectively by pouring water from a container into said basin or by delivering water from said conduit into said basin.

2. The apparatus for delivering hot water of claim 1 wherein said basin defines a side wall having an opening therethrough and said supply conduit delivery end extends through said side wall opening.

3. The apparatus for delivering hot water of claim 1 wherein said basin defines a side wall having an opening therethrough and said supply conduit delivery end extends through said side wall opening and said apparatus further includes means for sealing said supply conduit delivery end to said side wall at said opening to preclude leakage of water from said basin outwardly through said side wall opening.

4. The apparatus for delivering hot water of claim 1 wherein said basin defines a side wall and said conduit delivery end extends downwardly into the basin to below the upper edge of said side wall.

5. The apparatus for delivering hot water of claim 1 wherein said basin defines a side wall and said conduit delivery end comprises a gooseneck portion extending upwardly about said side wall with the distal end thereof disposed in said basin below the level of the upper edge of said side wall.

6. Apparatus for delivering hot water to a receiver comprising: a basin disposed to receive water poured thereinto from a container; a tank having an inlet connected to said basin for conducting water delivered into said basin from said basin to the tank; means for heating water in said tank; an outlet for delivering hot water from the tank to said receiver as a result of delivery of water to the tank through said inlet; a supply conduit having a delivery end opening to said basin; valve means for controlling delivery of water under pressure through said conduit into said basin; and means for selectively controlling operation of said valve means whereby delivery of hot water to said receiver may be selectively by pouring water from a container into said basin or by delivering water from said conduit into said basin, said valve means including a solenoid operator and said means for selectively controlling operation of the valve means comprising manually operable electrical switch means.

7. The apparatus for delivering hot water of claim 6 wherein said means for selectively controlling operation of the valve means further includes a timer arranged to open said valve means for a preselected period of time corresponding to a delivery of a preselected quantity of water through said conduit, as an incident of a manual operation of said switch means.

8. The apparatus for delivering hot water of claim 6 wherein said means for selectively controlling operation of the valve means further includes a pressure regulator connected in said conduit in series with said valve means and a timer arranged to open said valve means for a preselected period of time corresponding to a delivery of a preselected quantity of water through said conduit, as an incident of a manual operation of said switch means.

9. The apparatus for delivering hot water of claim 6 wherein said means for selectively controlling operation of the valve means further includes a timer arranged to open said valve means for a preselected period of time corresponding to a delivery of a preselected quantity of water through said conduit, as an incident of a manual operation of said switch means, and means responsive to a continuous operation of said switch means for causing said solenoid to maintain said valve means open in the event of a failure of said timer.

10. The apparatus for delivering hot water of claim 9 wherein said switch means comprises a toggle switch connected in electrical parallel with said timer.

11. Apparatus for delivering hot water to a receiver comprising: a basin disposed to receive water poured thereinto from a container; a tank having an inlet connected to said basin for conducting water delivered into said basin from said basin to the tank; means for heating water in said tank; an outlet for delivering hot water from the tank to said receiver as a result of delivery of water to the tank through said inlet; a supply conduit having a delivery end opening to said basin; valve means for controlling delivery of water under pressure through said conduit into said basin; and means for selectively controlling operation of said valve means whereby delivery of hot water to said receiver may be selectively by pouring water from a container into said basin or by delivering water from said conduit into said basin, said outlet comprising conduit means for conducting hot water from the tank through the space defined by the basin and thence to the receiver.

12. Apparatus for delivering hot water to a receiver comprising:
a basin disposed to receive water poured thereinto from a container;
a tank having an inlet connected to said basin for conducting water delivered into said basin from said basin to the tank;
means for heating water in said tank;
an outlet for delivering hot water from the tank to said receiver as a result of delivery of water to the tank through said inlet;
a supply conduit having a delivery end opening to said basin;
valve means for controlling delivery of water under pressure through said conduit into said basin;
means for selectively controlling operation of said valve means whereby delivery of hot water to said receiver may be selectively by pouring water from a container into said basin or by delivering water from said conduit into said basin; and
means for selectively closing said inlet and outlet and concurrently providing means for conducting water directly from said basin to said receiver whereby hot water delivered into said tank is conducted to said receiver bypassing said tank.

13. The apparatus for delivering hot water of claim 12 wherein said last named means comprises means for conducting hot water from said tank to a second inlet to said basin, a basin outlet opening in the bottom of said basin, and a plug-in connector removably connecting said second inlet to said outlet opening, said connector being further arranged to selectively connect said second inlet to said heating tank inlet for preventing flow of water from said basin into said tank while opening said basin outlet for conducting water delivered into the basin directly therefrom through said basin outlet to said receiver.

14. The apparatus for delivering hot water of claim 12 wherein said last named means comprises means for conducting hot water from said tank to a second inlet to said basin, a basin outlet opening in the bottom of said basin, and a plug-in connector removably connecting said second inlet to said outlet opening, said connector being further arranged to selectively connect said second inlet to said heating tank inlet for preventing flow of water from said basin into said tank while opening said basin outlet for conducting water delivered into the basin directly therefrom through said basin outlet in said receiver, each of said tank inlet, said second basin inlet, and said basin outlet comprising openings in the bottom of said basin and said connector comprising a U-connector having opposite ends adapted to sealingly selectively connect to said openings.

15. The apparatus for delivering hot water of claim 12 wherein said supply conduit is fixedly connected to said basin.

16. The apparatus for delivering hot water of claim 12 wherein said supply conduit extends adjacent said tank.

* * * * *